United States Patent [19]

Seto et al.

[11] Patent Number: 5,060,012
[45] Date of Patent: Oct. 22, 1991

[54] IMAGE REPRODUCING DEVICE WHICH DETECTS THE END OF A PHOTOSENSITIVE FILM

[75] Inventors: Takashi Seto, Ayase; Kouji Ozaki, Tokyo; Osamu Kobayashi, Tokyo; Shigeru Suzuki, Yokohama, all of Japan

[73] Assignee: Ricoh Company, Ltd., Tokyo, Japan

[21] Appl. No.: 359,581

[22] Filed: Jun. 1, 1989

[30] Foreign Application Priority Data

Jun. 3, 1988 [JP] Japan .................. 63-135600
Sep. 6, 1988 [JP] Japan .................. 63-116399
Feb. 28, 1989 [JP] Japan .................. 1-45306

[51] Int. Cl.$^5$ .......................... G03B 29/00
[52] U.S. Cl. ...................... 355/28; 355/29; 355/64
[58] Field of Search ........... 355/27, 28, 29, 64, 355/65, 310; 83/62, 63, 73

[56] References Cited

U.S. PATENT DOCUMENTS

| 3,922,083 | 10/1975 | Freeman. | |
|---|---|---|---|
| 3,950,090 | 12/1975 | Washio. | |
| 4,783,683 | 11/1988 | Nagumo et al. | 355/27 |
| 4,819,024 | 4/1989 | Kagayama et al. | 355/28 X |
| 4,919,531 | 4/1990 | Mashiko et al. | 355/27 |
| 4,942,422 | 7/1990 | Mashiko et al. | 355/28 |
| 4,945,381 | 7/1990 | Yamagata et al. | 355/27 |

FOREIGN PATENT DOCUMENTS

| 0261509 | 3/1988 | European Pat. Off. . |
| 3707822 | 9/1987 | Fed. Rep. of Germany . |
| 1369077 | 10/1974 | United Kingdom . |
| 2188168 | 9/1987 | United Kingdom . |

Primary Examiner—R. L. Moses
Attorney, Agent, or Firm—Oblon, Spivak, McClelland, Maier & Neustadt

[57] ABSTRACT

An image reproducing device includes a container for storing a strip-like photosensitive material in a condition that the photosensitive material is rolled, the photosensitive material having a mark at a predetermined length from a final end thereof. Rollers pull out the rolled photosensitive material from the container and convey the photosensitive material. A cutter cuts the conveyed photosensitive material into a sheet-like photosensitive sheets one by one. A pair of developing rollers roll the cut photosensitive sheet put together with a transfer sheet between which a developer-containing pod is interposed. A detector detects the marking of the conveyed photosensitive material, and a controller inhibits the cutter from cutting the photosensitive material in a case where the detector detects the mark of the conveyed photosensitive material.

7 Claims, 12 Drawing Sheets

IMAGE REPRODUCING DEVICE WHICH DETECTS THE END OF A PHOTOSENSITIVE FILM

BACKGROUND OF THE INVENTION

1. Field of the Invention

The present invention relates to a peel-apart type image reproducing device in which rolled strip-like photosensitive material is cut into photosensitive sheets one by one, the photosensitive sheet is overlaid with a developer-containing pod and a transfer sheet, to burst the pod thereby transferring and visualizing latent images formed on the photosensitive sheet to a transfer sheet. Particularly, it relates to an image reproducing device having features in the detection for the rear end of a photosensitive film and applying different controls depending on the detected state.

2. Discussion of the Background

The image reproducing device using the peel-apart type instant photographic film of the aforementioned type is adapted such that a rolled photosensitive film is pulled out to an exposure position, a photosensitive sheet formed by cutting the photosensitive film into a predetermined length and a transfer sheet transported from a predetermined position under a controlled timing are overlaid over each other with a developer-containing pod put between them, and the sealing portion of the pod is bursted under a roller pressure to cast the developer uniformly between both of them, thereby developing a latent image formed on the photosensitive sheet and transferring the thus developed latent image to the transfer sheet.

Referring more specifically to the developing section, it is necessary that the developer is uniformly cast between the photosensitive sheet and the transfer sheet. Accordingly, the development is conducted by passing both of the photosensitive sheet and the transfer sheet between a pair of rollers having a minute gap called developing rollers. In view of the above, an excess amount of developer is required for the image formation in order to prevail the developer sufficiently as far as the rear end of the transfer sheet and the excess developer is stored at the rear end of the sheet. In this case, it is intended that the developer not exude beyond the edge of the sheet to contaminate the inside of the copying machine. In addition, the photosensitive sheet is formed to be longer by a length required for the transportation than the length of the photosensitive sheet required for the actually set number of sheets, for example, 36 sheets.

On the other hand, it has been known in an electro-facsimile machine using a rolled zinc oxide photosensitive paper that the rear end of the rolled photosensitive paper is detected by a marking applied to the rear end of the paper and the rolled photosensitive paper is discharged as it is out of the machine by a pair of pressure rollers with no cutting.

As for related arts relating to the present invention, U.S. Ser. No. 196,604 filed on May 20, 1988, U.S. Ser. No. 277,948 filed on Nov. 30, 1988 and Service manual No. 4 of BS470, pp. 56 to 58, published by Ricoh company Ltd. on June 1981 JAPAN.

However, if the rolled photosensitive paper discharging system in the electrofocsimile machine is applied as it is to the peel-apart type image reproducing device, since the marking position is situated at the final end and the remaining length can not previously be judged, if the photosensitive film cut by the cutting means is shorter than that for one sheet length set for the image formation, the developer cast between both of the sheets exudes from the rear end of the photosensitive sheet and the transfer sheet, to then adhere to the developing rollers. As a result, it contaminates the inside of the machine, including the developing rollers, impaires the circularity of the developing rollers, thereby bringing about undesirable effects such as uneven density in the formed image or causing troubles due to the adhesion of the developer from the developing rollers to the further equipment in the machine.

In addition, in a case where an image is not formed at a predetermined position but the image forming position is displaced rearwardly because of jamming, the photosensitive film of the final sheet may occasionally be cut in the middle. In this case, since the transfer sheet and the pod are consumed based on the cut photosensitive film, although no complete image can be formed, it results in the wasteful consumption of the photosensitive film, the transfer sheet and the developer, which is not economical. On the other hand, if the photosensitive film is formed longer than the previously set number of image forming sheets as described above, if all of the images are formed completely at predetermined positions, the additional length part is used wastefully to also invite economical disadvantage. Since silver salt is used for the photosensitive film, this results in an additional cost.

Furthermore, if the final sheet of the photosensitive film is cut at an intermediate portion and the distance between the cut portion and the final end of the photosensitive film is shorter than the distance between the conveyor rollers disposed on both sides of the cutting means, the portion of the photosensitive film from the cut portion to the final end can not be transported, causing jamming in the machine, which necessitates taking out the photosensitive film by opening the copying machine on every jamming, resulting in a problem of poor handlability.

In addition, if the film is cut as has been described above, it results in such a portion of the photosensitive film that can not be used for the image preparation which wastefully consumes the expensive photosensitive film and increases the operating cost. Further, in a case where the length of the photosensitive film is previously increased for transportation, as has been described above and a marking for distinguishing is applied to the increased portion, the image preparing area and the marking position may sometimes overlap with each other, by which an image is absent in the marking position after the image formation, by which complete transfer image can not be obtained.

SUMMARY OF THE INVENTION

A first object of the present invention is to provide an image reproducing device which is capable of avoiding the wasteful use of a transfer sheet and a developer, and which is free from contamination with developer at the inside of a machine.

A second object of the present invention is to provide an image reproducing device capable of effectively using a photosensitive film thereby reducing the operating cost.

A third object of the present invention is to provide an image reproducing device with no risk of jamming on the inside of a machine.

An image reproducing device according to the present invention will comprise a storing means for storing a strip-like photosensitive material in a condition that the photosensitive material is rolled. The photosensitive material will have a marking at a position apart by a predetermined length from a final end of the rolled photosensitive material. A conveying means will then pull out the rolled photosensitive material from the storing means and convey the photosensitive material. A cutting means for cutting successively the conveyed photosensitive material into respective photosensitive sheets with a predetermined length is then employed. A pair of developing rollers is utilized for rolling each of the cut photosensitive sheets put together with a transfer sheet between which a developer-containing pod is interposed. A detecting means than detects the marking of the conveyed photosensitive material, and a measuring means measures a remaining length of the stored photosensitive material in a case where the detecting means detects the marking of the conveyed photosensitive material. Also, a separating means for separating a pair of the developing rollers from each other in a case where the measured remaining length is less than a length required for image formation is employed.

According to the first device of the present invention, since the photosensitive material is discharged without cutting when the marking is detected, there is no leakage of the developer from the rear end of the photosensitive sheet even if the pad is bursted between the transfer sheet and the photosensitive sheet and, accordingly, it is possible to provide an image reproducing device which is free from contamination in the machine caused by the developer.

A second object of the present invention can be attained by an image reproducing device comprising a storing means for storing a strip-like photosensitive material in a condition that the photosensitive material is rolled, the photosensitive material having a marking formed as a boundary between a rear end of the rolled photosensitive material and a flexible strip-like material which is appended to the rear end and has a predetermined distance. A conveying means for pulling out the rolled photosensitive material from the storing means and conveying the photosensitive material is also utilized. Further, a cutting means for cutting successively the conveyed photosensitive material into respective photosensitive sheets with a predetermined length is employed. A pair of developing rollers for rolling each of the cut photosensitive sheets put together with a transfer sheet between which a developer-containing pod is interposed is utilized. Further, a detecting means detects the marking of the conveyed photosensitive material. Then, a calculation means calculates a final image forming area for the photosensitive material based on the detection of the marking by the detecting means, and a separating means separates an pair of the developing rollers from each other in a case where the calculated final image forming area is less than an image forming area required for image formation.

A third image reproducing device comprises a storing means for storing a strip-like photosensitive material in a condition that the photosensitive material is rolled up. The photosensitive material has a mark or marking at a position apart by a predetermined distance from a final end thereof. The marking is positioned out of a latent image forming area of the photosensitive material. A conveying means pulls out the rolled photosensitive material from the storing means and conveys the photosensitive material. A cutting means cuts the conveyed photosensitive material into a sheet-like photosensitive sheet one by one. A pair of developing rollers roll the cut photosensitive sheet put together with a transfer sheet between which a developer-containing pod is interposed. A detecting means is disposed between the storing means and the cutting means for detecting the marking of the conveyed photosensitive material.

According to the second device of the present invention, since the portion of the photosensitive material after the rear end that can not be utilized for the image formation is replaced with flexible strip-like material which is different from the photosensitive material, it is possible to provide an instant photographic apparatus capable of effectively using the photosensitive material and reducing the operating cost.

According to a third embodiment of the present invention, since the marking is applied to a position out of the image forming region of the photosensitive material, the does not cause troubles in the image formation and it is possible to provide an image reproducing device capable of effectively using the photosensitive material and reducing the operating cost.

The third object of the present invention can be attained by a fourth image reproducing device, wherein the photosensitive material has a marking at a position apart by a predetermined length from a final end thereof, the predetermined length relating to the marking on the photosensitive material which is set longer than the longest inter-roller distance between the conveying rollers disposed in a conveying path of the photosensitive material.

According to a fourth embodiment of the present invention, the photosensitive material can surely be conveyed even if cutting is conducted in the final sheet and it is possible to provide an image reproducing device which is free from jamming in the machine.

Further objects and advantages of the present invention will be apparent from the following description, reference being had to the accompanying drawings wherein preferred embodiments of the present invention are clearly shown.

DESCRIPTION OF THE PREFERRED EMBODIMENT

Figure 1:
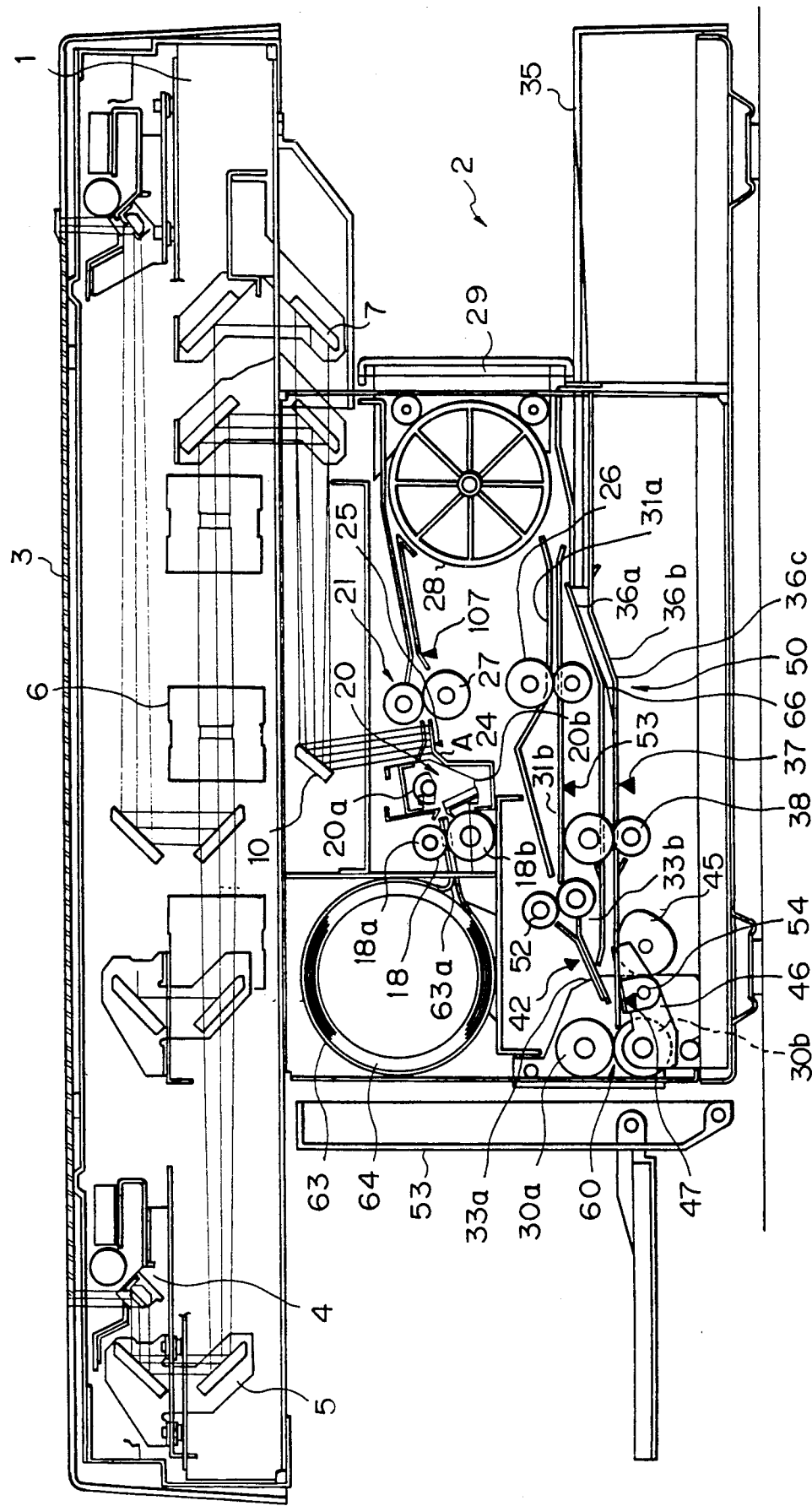
FIG. 1 is an entire schematic view illustrating the inner structure of an image reproducing device according to this invention.

FIG. 1 is an entire schematic view for a peel-apart type instant photographic apparatus.

In the drawing, the instant photographic apparatus comprises an optical system unit 1 adapted to apply irradiation light while scanning the surface of an original document and forming an image at a predetermined position (exposed surface), and a conveying unit 2 adapted for conveying a photosensitive sheet to a predetermined position and exposing the same, overlaying the sheet with a transfer sheet in alignment therewith, casting a developer therebetween for transferring an image on the transfer sheet.

The outline for the inner structure of the instant photographic apparatus will now be explained.

The optical system unit 1 comprises a contact glass 3, a first running structure 4 having a first mirror and a light source, a second running structure 5 having a second mirror and a third mirror, a third running structure 7 having a fourth mirror, a fifth mirror and a sixth mirror 10, etc.

A fluorescent lamp used as a light source disposed in the first running structure 4 for color rendering use, etc. is desirable for obtaining satisfactory color reproduction and it irradiates the original document placed upside-down on the glass 3 while scanning in parallel with the glass 3. The second running structure 5 scans in the same direction and at ½ scanning rate the that of the first running structure 4 to maintain the optical path length constant from the surface of the original document to an exposure drum. The magnifying factor upon variable magnification and the conjugate length are controlled by the movement of the lens 6 and the third running structure 7. The reflection light from the original document is reflected on the second and the third mirrors and, further, is passed by way of the lens 6, the fourth, fifth and sixth mirrors and apply slit-wise exposure at an exposure position A.

The conveying unit 2 basically comprises a delivery section 18 for a photosensitive film 64, a cutter section 20 for cutting the delivered photosensitive film 64, a photosensitive sheet conveying and exposing section 21, a transfer sheet conveying section 50 and a developing section 60.

The delivery section 18 comprises a pair of pulling rollers 18a, 18b disposed along a discharge port 63a for the photosensitive film 64 in a light-screening vessel 63 described later. The cutter section 20 is disposed downstream in the conveying direction of the photosensitive film. The cutter section 20 comprises a fixed blade 20b and a rotational blade 20a opposed thereto, which are adapted to cut the film 64 to a predetermined sheet length by an instruction from a CPU 110 described later.

The photosensitive sheet conveying-exposing section 21 basically comprises the exposure section A formed on a flat surface over the entire area of a slit region, an intermediate roller pair 27, a roller 28 of greater diameter, guide plates 31a, 31b, and two roller pairs 26, 52 disposed before and after the conveying direction of the film 64, in which a conveying path for the film 64 is formed from the intermediate roller pair 27 and along the outer circumference of the roller 28 and the guide plates 31a, 31b. The transfer sheet conveying section 50, which protrudes from the inside to the outside of the machine, comprises a lower guide plate 35 on which the transfer sheet 14 is placed in the initial state, guide plates 36a, 36b extended from the top end of the lower guide plate 35 in the machine to the developing section 60, and an insertion roller pair 38 protruding into a space put between two of glass plates 36a and 36b for conveying the sheet 14.

The developing section 60 basically comprises a pair of developing rollers 30a, 30b, and an arm 46 that supports the roller 30b, rotates around a pin 54 in accordance with the operation of a cam 45 and causes the roller 30b to approach to and away from the opposed roller 30a.

Figure 2:
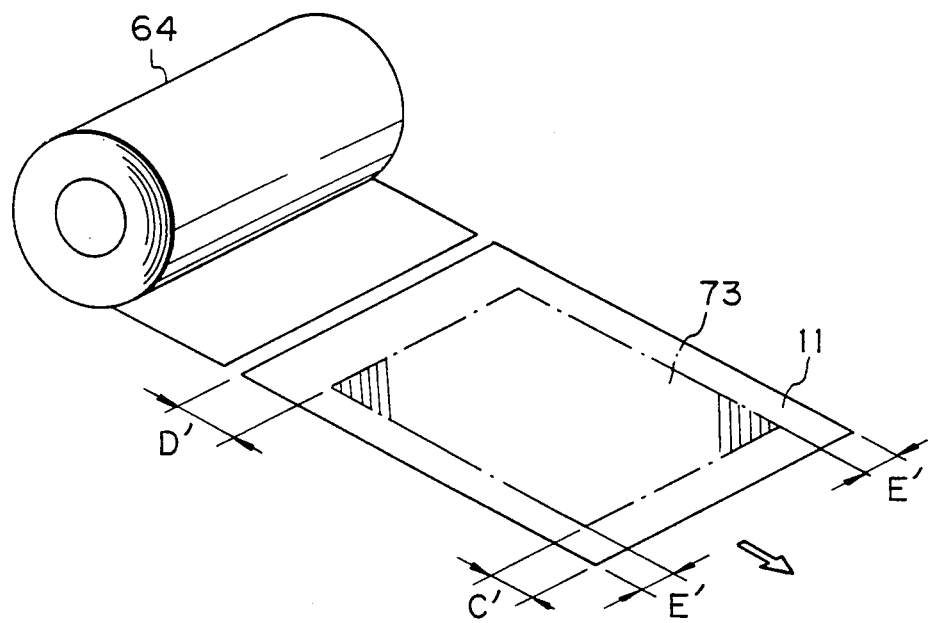
FIG. 2 is a perspective view illustrating a photosensitive material in an extended state.

Explanation is now made for the outline of the instant photographic film. Before explaining the details for the operation and the structure, the photosensitive film 64 and the transfer sheet 14 used here are outlined. FIG. 2 is a perspective view of the film 64 and the photosensitive sheet 11, respectively, and FIG. 3 is a perspective view for the sheet 14.

The instant photographic film used in this apparatus comprises the photosensitive film 64, the transfer sheet (print paper) 14 and a pack containing the developer (hereinafter simply referred to as a pod 15). The film 64 is exposed in the optical system unit 1 as described above to form a latent image thereon. Then, the film 64 formed with the latent image is cut into a portion for which the latent image is formed by the cutter section 20 into the sheet 11. Then, the latent image forming surface of the sheet 11 and the image transfer surface of the sheet 14 are joined and they are passed in this joined state between the roller pair 30a, 30b. During passage, the rear end of the pod 15 previously appended to the forward end of the sheet 14 is burst, by which the developer flows out from the pod 15 and is uniformly cast between the sheet 14 and the sheet 11 by means of the pressure of the rollers 30a, 30b. The development is started by the casting of the developer, in which the sheet 11 develops color within several tens of seconds and the color developer is transferred onto the sheet 14. After the transfer, when the sheet 11 is peeled off from the sheet 14, a positive color image is obtained on the sheet 14.

The film 64 has a long length and is rolled with the latent image forming surface on the inside. Since it has a photosensitivity, the film is contained in the light-screening vessel 63 for screening out the light. Then, the end of the film 64 is pulled out by a predetermined length by means of the pulling rollers 18a, 18b on every image preparation, applied with the exposure and formed with a latent image over the image forming area 73 shown by the dotted chain in FIG. 2 and then cut into a sheet-like shape by the cutter section 20, as described above, to form the sheet 11.

Figure 3:
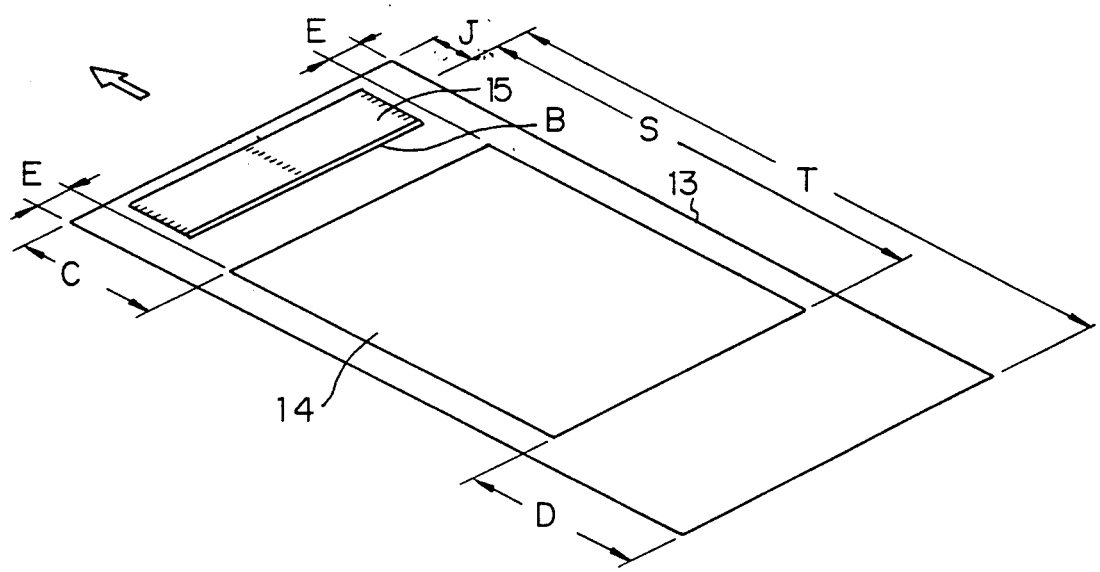
FIG. 3 is a perspective view illustrating the state of the transfer sheet, the carrier sheet and the pod.

The sheet 14 is formed into a required image transfer area and appended on a carrier sheet 13 as shown in FIG. 3. The sheet is releasably appended with the image transfer surface on the outside. In this case, if the sheet of the same area as that of the sheet 13 is used, the sheet 13 is no longer necessary. However, if the thickness of the sheet 14 is thin or a transparent sheet 14 is used, room light intrudes from the rear face of the sheet during development to cause fogging. In order to prevent this, it is necessary to add a light screening member to the sheet 14. Accordingly, the sheet 13 has a role as the light screening member.

The sheet 13 is somewhat larger than the sheet 14 and marginal portions C, D and E are formed to the top end, both sides and the rear end of the sheet 13 respectively, in which the pod 15 is appended at the top end of the sheet 13 at the uppermost stream thereof in the conveying direction of the sheet 13. Thus, the sheet 13 also constitutes a supply means for the pod 15 in this embodiment. Since the bursting portion of the pod 15 is formed at the rear end B of the pod 15 at the downmost stream thereof in the conveying direction, it is difficult to cast the developer over the entire length in the longitudinal direction of the pod 15. Further, a certain approaching distance is somewhat required for casting the developer to both of the sides of the sheet 14 after the bursting of the pod 15. Accordingly, since no satisfactory image can be formed for the entire width of the sheet 13 in this approaching distance, that is, no an image transfer can be obtained from the sheet 11, image is formed while being displaced by the approaching distance shown as C in FIG. 3. The developer encapsulated in the pod 15 is contained in a greater amount than that required for forming the image so that the developer can sufficiently prevail as far as the rear end of the sheet 14. The excess developer is stored in the rear end between both of the sheets 11 and 14 (corresponding to D, D') to prevent the exudation of the developer from between the sheets 11 and 14 and the deposition of the developer on the rollers 30a, 30b, etc.

Details for the conveying unit 2 will now be explained in conjunction with its operation.

The conveying unit 2 has the structure as has been outlined above, in which the film 64 having the same width as that of the transfer sheet 14 and contained in a rolled state in the light-screening vessel 63 is put between the rollers 18a, 18b and then conveyed by the rotation of them toward the roller pair 27 through the exposure section A.

When the top end of the conveyed film 64 is detected by a sensor 25, or after a predetermined time from the detection, the first scanning structure 4 and the second scanning structure 5 conduct scanning to expose the film at the exposure section A, the guide plate 24, to a latent image.

The exposure section A is formed on the flat surface over the slit area and disposed at a position identical with or higher than the nip height of the roller pairs 18 and 27. The circumferential speed of the roller pair 27 is made slightly greater than the circumferential speed of the pulling roller 18, and an over-running mechanism is disposed to the rolls of the roller pair 18.

Accordingly, the film 64 is conveyed under a slight tension over the exposure section A and conveyed while being in close contact to the guide plate 24. This can maintain the optical path length to the surface of the film 64 and the conveying speed constant.

The film exposed for a predetermined length and formed with a latent image is once stopped and then cut into a sheet-like shape by the rotation of the rotational blade 20a while being in contact with the fixed blade 20b. The stop timing is determined by counting the time t after the detection of the top end of the film 64 by a sensor 107.

Although the scanning speed in the optical system varies depending on the variable magnification, since the conveying speed of the film 64 is constant, a predetermined length of the sheet 11 is obtained by interrupting the conveyance of the film 64 and applying cutting after a predetermined period of time t from the detection of the top end of the film 64. Therefore, the latent image can not be formed in the rear end of the cut sheet 11, at least for the portion exceeding the distance from the exposure position A to the top end of the fixed blade 20b. However, if the exposure position A, and the rotationaly blade 20a and the fixed blade 20b are disposed such that the above-mentioned distance is made shorter than the distance to the rear end of the image area transferred on the sheet 14 described later (D in FIG. 3), wasteful consumption of the film 64 (cutting more length than required) can be prevented since this is a region which is unnecessary for the image formation, thereby overcoming the foregoing defect.

In the same manner, the latent image can not be formed in the top end of the cut sheet 11 at least for the portion exceeding the distance from the detection position by the sensor 107 to the exposure position A. However, if the exposure position A and the sensor 107 are disposed such that the distance is made shorter than the distance from the top end of the sheet 11 to the top end of the latent image formed on the sheet 11 (C' in FIG. 2), wasteful consumption of the film 64 can be prevented. Furthermore, in the above-mentioned system, since the film 64 is cut after the exposure has been completed, change of the conveying speed due to cutting impact, etc. which would be caused by cutting during exposure, can be prevented.

The cut sheet 11 is changed in its direction by about 180 degree by the roller 28 and the guide plate 29, and then conveyed until the top end of the sheet 64 is abutted against the roller pair 52 the rotation of which then stopped. Conveying, exposure and cutting for the film 64 and the sheet 11 as described above are conducted in a dark place of the machine formed by interrupting external light by means of housing for the instant photographic apparatus.

The sheet 14 is conveyed preceding to the conveyance (exposure, cutting) of the film 64. Different from the sheet 11, since the sheet 14 has no photosensitivity, it can be inserted directly from the outside of the machine. In this embodiment, the sheet 14 is inserted together with the sheet 13 one by one manually to the left along the lower guide plate 35 shown in the lower right portion of the main body in FIG. 1. This can eliminate the requirement for a paper feeder, a separator, a paper feeding cassette, etc., thereby enabling the apparatus to be constructed at a reduced cost and in a compact structure.

As shown in FIG. 1, when the sheet 13 and the sheet 14 are inserted into the machine along the lower guide plate 35 and the guide means on both sides (not illustrated) and, when the top end of the sheet 13 is detected by the sensor 37 disposed just in front of the roller pair 38, the roller pair 38 starts rotation. The rolls of the roller pair 38 are disposed at such positions as to grip only the both ends at the outside of the pod 15 so as not to crush the pod 15 appended to the top end of the sheet 13. The sheet 14 and the sheet 13 are conveyed between the guide plates 36a, 36b by the roller pair 38 and stopped when the top end of the sheet 13 abuts against the nip of the developing roller pair 30a, 30b. The stop timing is determined by counting a time t after the sensor 47 disposed just before the rollers 30a, 30b in the sheet conveying direction has detected the top end of the sheet 13.

A light-screening Myler 66 is appended over the entire width at the end thereof to the bent portion 36c at the inlet of the guide plate 36a and the sheet is urged to the guide plate 36b by the slight downward force caused by the rigidity of the Myler 66. The sheet 14 and the sheet 13 are conveyed while being rubbed between the top end of the Myler 66 and the guide plate 36b. The conveying path constituted with the guide plates 36a, 36b is bent at least at one portion as described above. The exposure to the sheet 11 due to the external light intruding from the insertion inlet and the conveying path of the sheet 14 can be prevented by interrupting light to the conveying path of the sheet 14 by means of the bending comprising the bent portion 36c, etc. and the Myler 66, etc.

Figure 4:
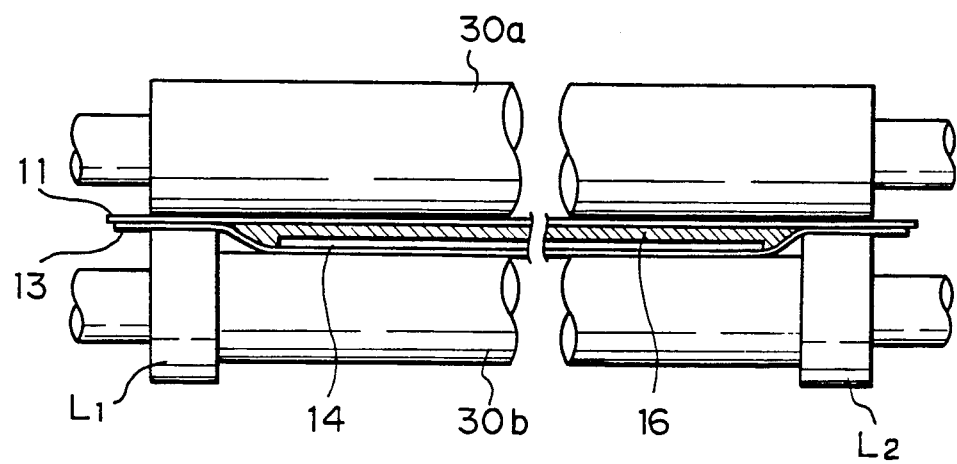
FIG. 4 is a front elevational view for a developing roller pair.

The development in the instant photographic apparatus requires means the uniform casting of the developer between the sheet 11 and the sheet 14. For attaining this, the roller 30a comprises a straight metal roller and the roller 30b comprises a stepped metal roller having collar portions $L_1$, $L_2$, respectively, as shown in FIG. 4 and both of the rollers are pressed by an appropriate force upon rolling contact. In this case, the sheet 11 and the sheet 13 are conveyed with side edges E, E' thereof shown in FIG. 2 and FIG. 3 being caught in the collar portions $L_1$, $L_2$ of the stepped metal roller (30b). In this case, the pod 15 is put between the sheet 11 and the sheet 14 at the inner side of the collar portions $L_1$ and $L_2$ and the three members are thus conveyed integrally. Further, since the developer 16 which flows out by the bursting of the pod 15 has a high viscosity, it causes both of the sheets 11 and 14 to be distorted as shown in the hatching of FIG. 4, until they are brought into tight contact with the cylindrical surface of the straight metal roller (30a) and the stepped metal roller (30b) respectively, and extend both of the sheets 11 and 14. Therefore, the developer between both of the sheets 11 and 14 is kept at a predetermined thickness of about 0.1 mm. The drawing of FIG. 4 illustrating the cast developer is in a somewhat exaggerated state for better understanding.

In such a developing mechanism, after the top end of the inserted sheet 13 has abutted against the roller pair 30a, 30b and stopped, conveyance, exposure and cutting are applied to the film 64. Then, the sheet 11 abutted against the stopped roller pair 52 is distorted by a predetermined extent in an enlarged portion between the guide plates 31a and 31b and then conveyed between the guide plates 33a and 33b by the rotation of the roller pair 52. The distortion upon abutting against the rollers 30a, 30b can provide the timing for conveying the sheet 11 and conduct skew correction for the top end of the sheet 11 along the nip of the roller pair 30a, 30b. The timing for starting the rotation of the roller pair 52 is obtained by counting a time t after the sensor 53 has detected the top end of the sheet 11.

Figure 5:
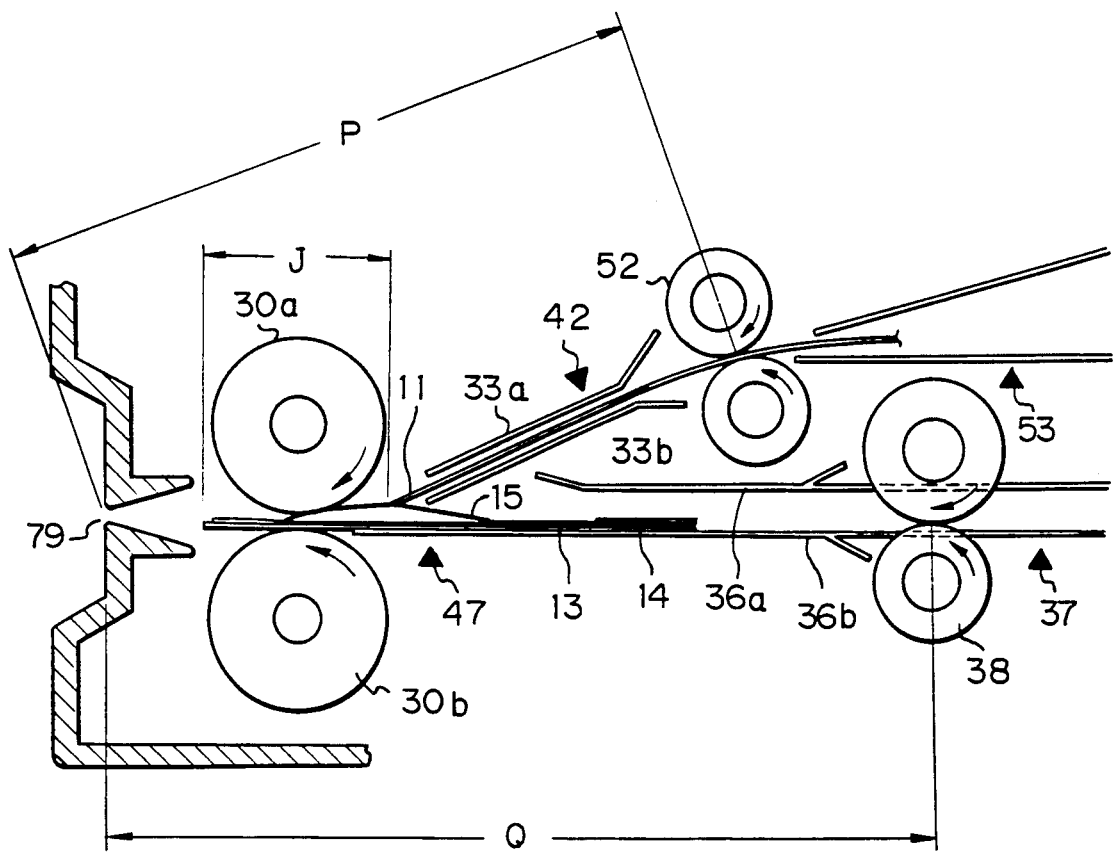
FIG. 5 is an enlarged view for a portion near the developing section.
Figure 9:
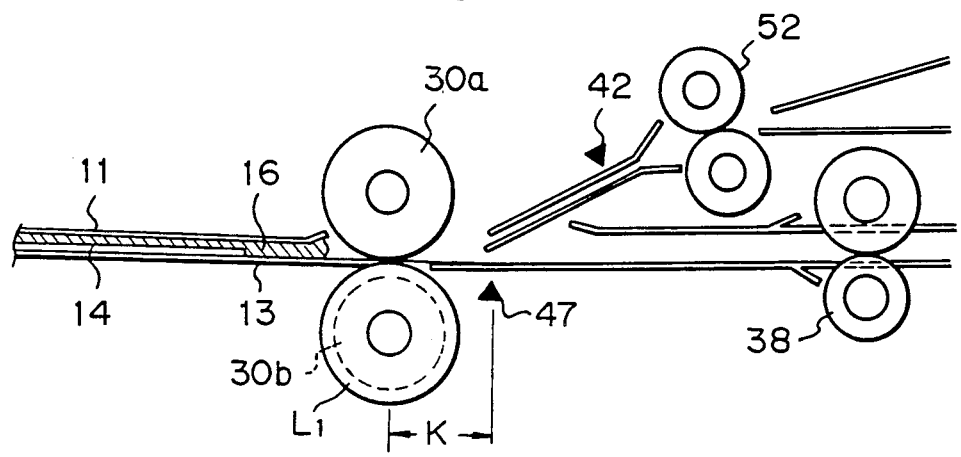
FIG. 9 is an enlarged view for a portion near the developing roller pair.

FIG. 5 is a schematic explanatory view illustrating the vicinity of the developing section 60, in which the roller pair 30a, 30b start their rotation at a timing provided by the sensor 53 or 42 disposed at the upstream or downstream in the conveying direction of the roller pair 52 before the top end of the sheet 11 abuts against the nip of the roller pair 30a, 30b and convey the sheet 13 which has already been abutted there. Subsequently, since the top end of the sheet 11 reaches the nip of the roller 30a, 30b by the rotation of the roller 52 and since both of them are conveyed at the circumferential speed of the roller pair 30a, 30b, there is a displacement J between the top ends of the sheet 13 and the sheet 11 as shown in FIG. 5. Since the displacement J is controlled so as to be shorter at least than C in FIG. 3, the length of the cut sheet 11 can be made shorter by the displacement J as compared with the conventional type of applying development while aligning the top ends of both of the sheet 11, 13 and, accordingly, the film 64 can be economized by so much.

Figure 6:
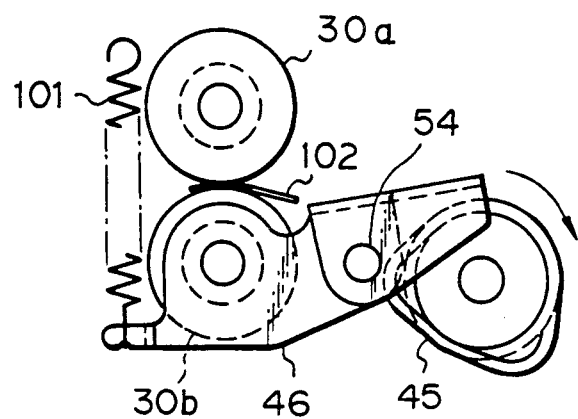
FIGS. 6 and 7 are, respectively, explanatory views for the mechanism of approaching and separating a developing roller pair.

The roller pair 30a, 30b usually stands-by or rotates in a state shown in FIG. 6 before development. The roller 30b is rotatably held at both ends thereof by means of an arm 46. The arm 46 is rotatably supported around a pin 54 and has a spring 101 mounted to the top end on the side opposite to the pin supporting side and causes the roller 30b to be in contact with the roller 30a under pressure by means of the resiliency. Further, a cam 45 is disposed at the end of the arm 46 on the side of supporting pin 54. In FIG. 6, the cam 45 is kept contact free from the arm 46.

Figure 7:
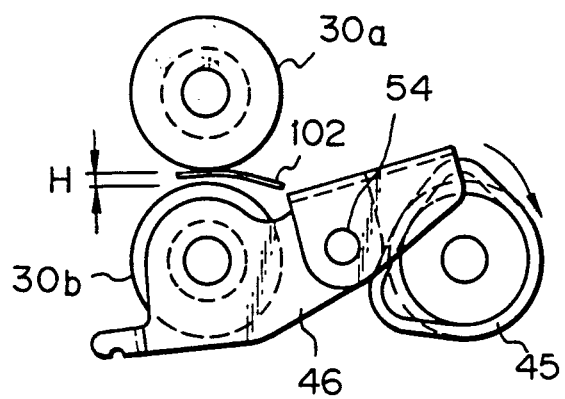
Figure 8:
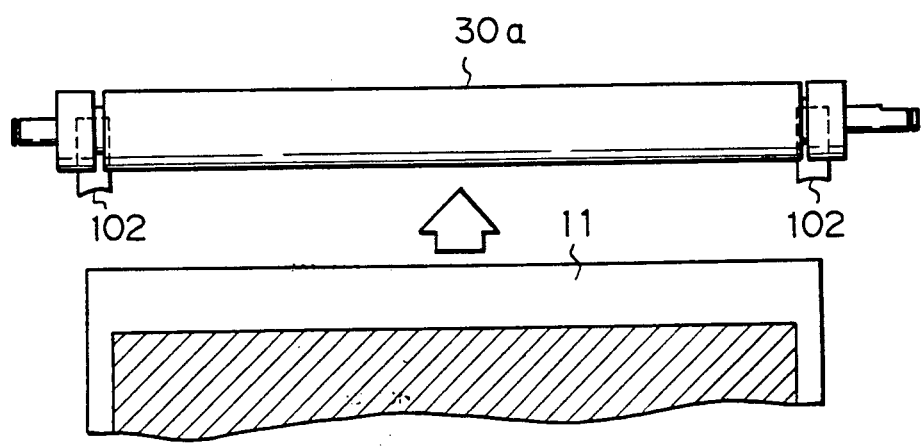
FIG. 8 is a plan view illustrating a photosensitive sheet and a developing roller pair.

Then, after the developer is cast over the image forming area 73 between the sheet 13 and the sheet 11 by means of the roller pair 30a, 30b and before the rear ends of both of the sheets 11 and 13 pass over the nip of the roller pair 30a, 30b, the cam 45 rotates and abuts against the arm 46 to raise it as shown in FIG. 7, thereby rotating the roller 30b in the counterclockwise direction in the drawing. Thus, the roller 30b is separated from the developing roller 30a to form a gap H between both of the rollers 30a, 30b. The gap H is set to such a size for at least not crushing the pod 15. Then, the rotation of the rollers 30a, 30b is stopped. The timing to separate the roller 30b by the rotation of the cam 45 is determined by counting a time after the sensor 37 has detected the rear end of the carrier sheet 13. Such an operation makes the distance larger between the sheet 11 and the sheet 13, thereby enabling to store excess developer in the region D, D' between both of the sheets 11 and 13 shown in FIG. 2 and FIG. 3. As shown in FIGS. 6, 7 and 8, leaf springs 102 are supported and disposed on the side plates of the developing unit (not illustrated), so that they are always in contact under pressure with both ends for the latent image forming area of the sheet 11. Further, a step (not illustrated) is formed to a portion of the roller 30b opposed to the spring 102, so that the spring 102 does not hinder the rotation of the developing roller 30b when it presses the roller 30a. Then, both of the sheets 11 and 13 between which the developer is cast are conveyed by the spring 102 and the roller 30a also after the separating of the rollers 30a, 30b and then discharged out of the machine. Subsequently, when the sheet 14 is peeled off from the sheet 11 after several tens of seconds, a full color image is formed on the positive sheet 14. After the discharging, the cam 45 rotates again to return the rollers 30a, 30b in the machine to the state as shown in FIG. 6.

In this control, it is also possible to stop the sheet 11 and the sheet 13 as they are tightly adhered to each other by the developer 16, with the rear end thereof being caught by the rollers 30a, 30b, which are then discharged out of the machine by an operator. In this case, "D" shown in FIG. 3 is made longer than the region D' at the rear end of the sheet 11 combined with the distance K from the sensor 47 to the nip of the roller pair 30a, 30b. In this case, even if the rear end of the sheet 13 remains between the sensor 47 and the roller pair 30a, 30b as shown in the figure, the rear end of the sheet 11 has already left the nip and since the developer 16 is stored between both of the sheet 11 and 13, the developer 16 does not exude to contaminate the rollers 30a, 30b, etc. even if the rollers 30a, 30b are pressurized.

Figure 10:
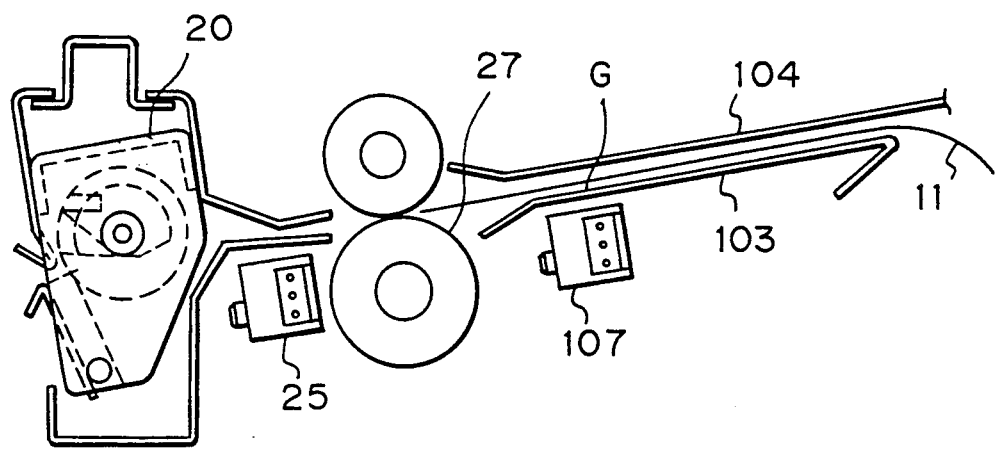
FIGS. 10 and 11 are, respectively, enlarged views for a portion near the cutter section.
Figure 11:
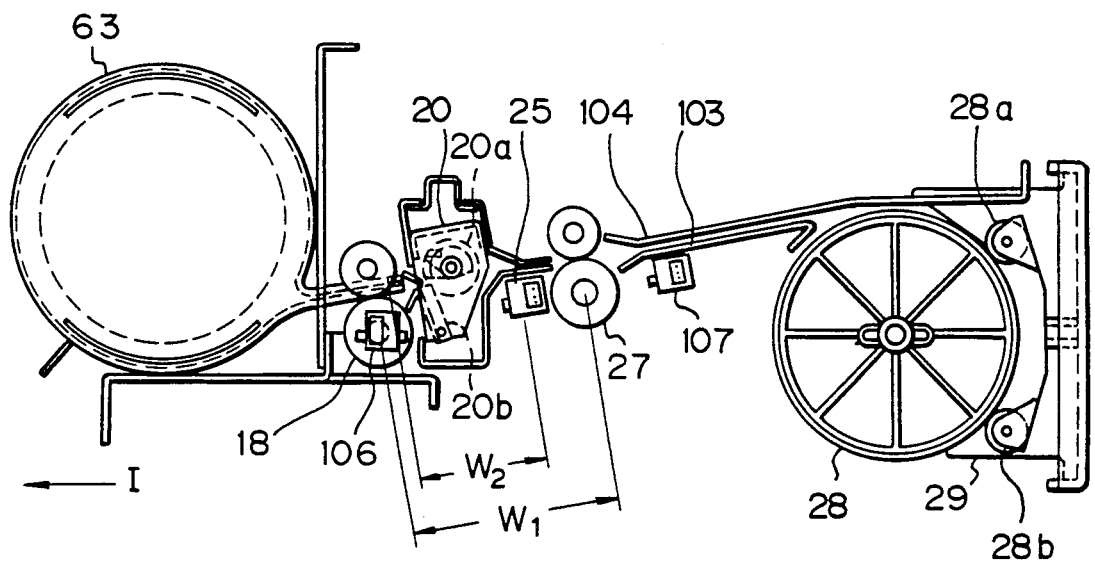

FIGS. 10 and 11 are schematic views for the cutter section 20. An end detection sensor 106 is disposed near a light screening vessel 63 and a sensor 25, an intermediate roller 27, guide plates 103, 104, a sensor 107, a roller 28, retainer rollers 28a, 28b, and a guide plate 29 are disposed in this order at the downstream of the cutter section 20. The sensor 25 can also be used as the sensor 107. As shown in FIG. 10, a recess G is formed at the midway, and the sensor 107 is disposed below the recess G in the drawing. The roller 27 is made rotatable forwardly and backwardly by a motor (not illustrated), the roller 28 has a support point (not illustrated) on the side of the main body and can rotate in the direction away from the guide plates 103 and 104. The guide plate 29 is also capable of opening and closing.

The treatment in the copying machine for the final sheet of the film 64 capable of photographing in the light screening vessel 63 will now be explained.

Figure 12:
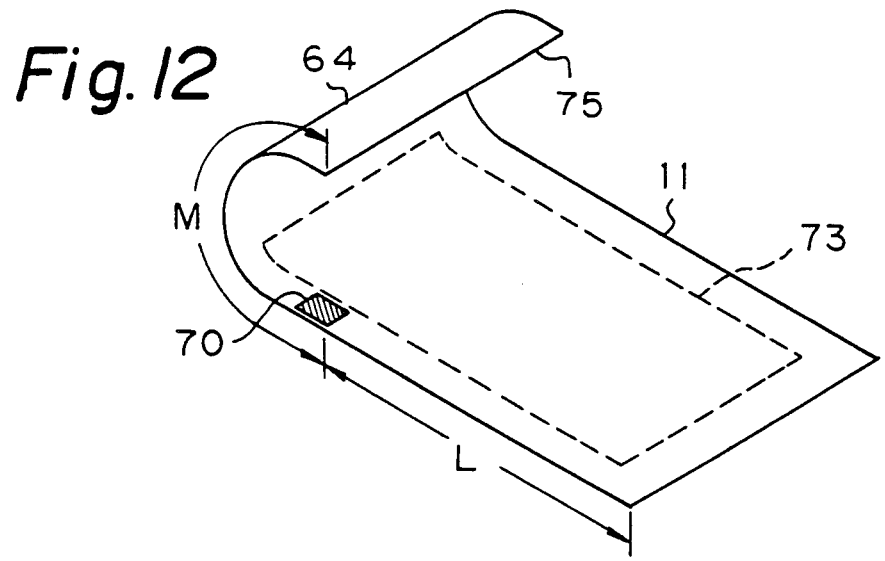
FIGS. 12 and 13 are, respectively, perspective views illustrating the rear end of the photosensitive material.

As shown in FIG. 12, a reference mark 70 with reflectance different from that of the film 64, for example, with a high reflectance is appended at a predetermined length M from the rear end 75 of the film 64, that is, at the end out of the image forming area 73 as a marking. The length M is set longer than the longest inter-roller distance in the conveying path, a distance from the nip of the roller pair 27 to the nip of the roller 28, 28a (about 150 mm) in this embodiment in order to avoid jamming as described later. As shown in FIG. 11, the reference mark 70 is detected by a light reflection type sensor 106 (photo reflector) disposed near the cutter section 20 and the detected signal is outputted to a central processing unit (hereinafter simply referred to as CPU) 110 of a control circuit relevant to the conveyance of the film 64. The CPU 110 recognizes that the film 64 in the vessel 63 is at the final sheet depending on the detected input.

Figure 13:
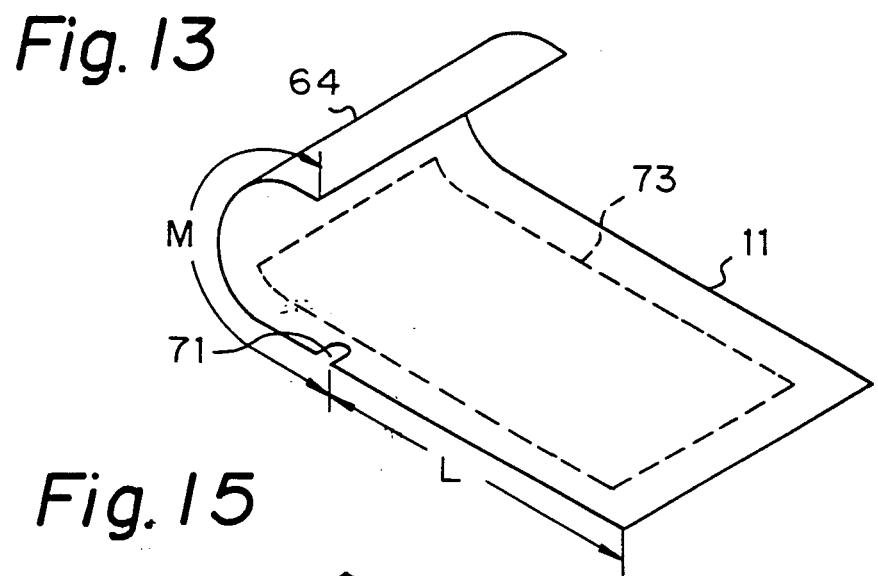

Although the reference mark 70 with a high reflectance is used in this embodiment, this is dependent on the combination with the sensor 106. If the sensor 106 is, for instance, a light transmission type (photointerruptor), the marking may be constituted by forming a recess 71 as shown in FIG. 13.

Figure 14:
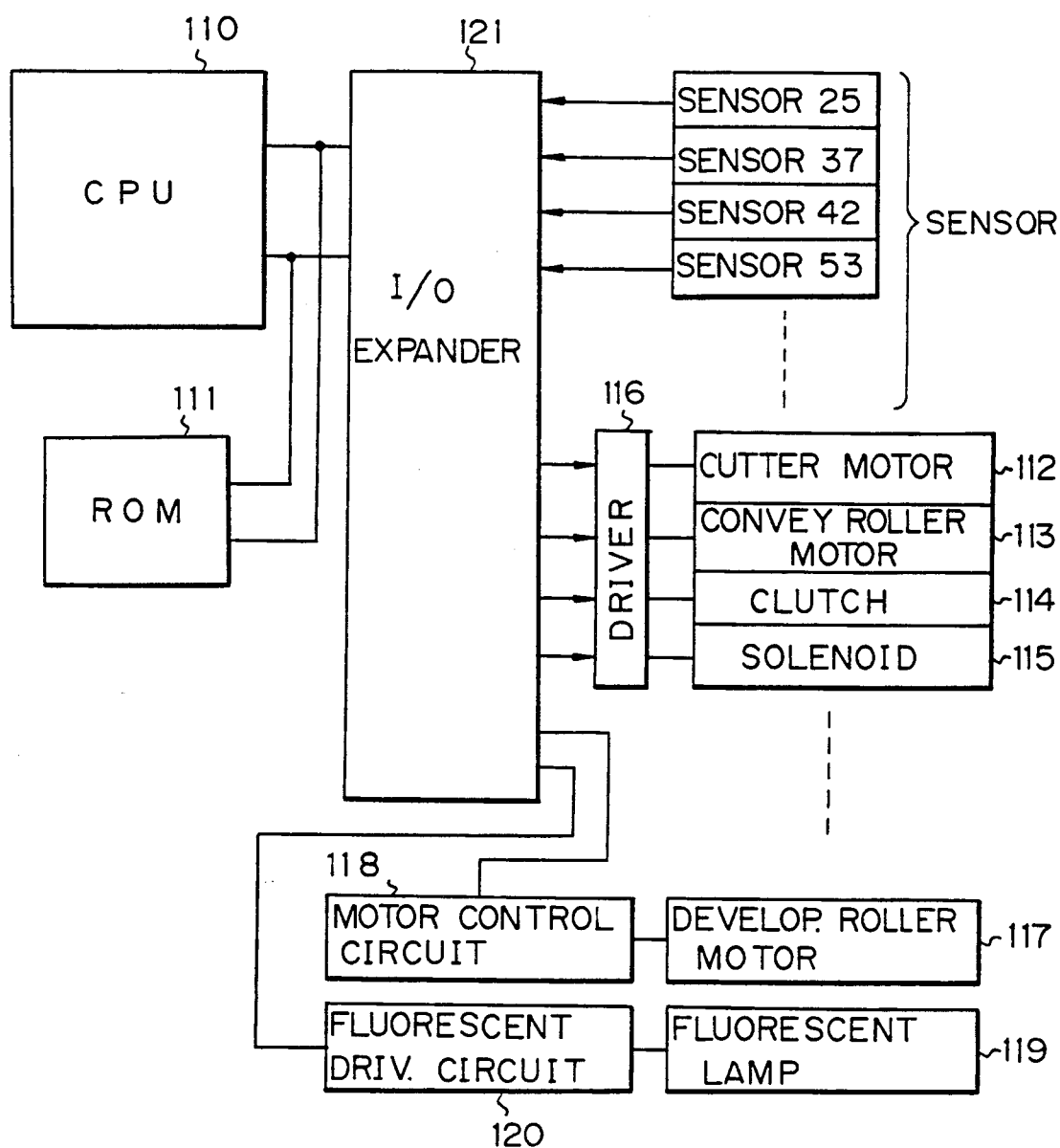
FIG. 14 is a block diagram illustrating the schematic constitution of a control circuit.

The control circuit comprises, as illustrated in the block diagram of FIG. 14, a CPU 110 for selecting and controlling the contents of treatment in accordance with the conveyance, cutting and the residual amount of the film 64, a read only memory 111 having contents for treatment and procedures previously stored therein (hereinafter simply referred to as ROM 111), and I/0 expander 121 for receiving the outputs from various kinds of sensors 25, 38, 42, 47, 53, 106 and 107, outputting drive control signals to a driver 116 for a cutter motor 112, a conveyor roller motor 113, clutch 114, solenoid 115, etc. and controlling input/output between the motor control circuit 118 for a developing roller motor 117 and a fluorescent lamp driving circuit 120 for controlling the lighting of a fluorescent lamp 119 and the CPU 110. In the control circuit, when the reference mark 70 is detected by the sensor 106 during conveyance of the film 64 after starting the copying operation, the CPU 110, receiving this input, stops the rotation of the motor 112 and inhibits the cutting for the film 64. Accordingly, at least 150 mm of length for the longest inter-roller distance remains in this case and, even if the marking has been detected just after the starting of the copying operation, the sheet 11 is not left out of the machine, but conveyed as far as the roller pair 30a, 30b. The separating timing for the roller pair 30a, 30b in this instance is provided by detecting the rear end of the sheet 13 by the sensor 47 as described above. Since the conveying force is removed after separating the roller pair 30a, 30b, there is a worry that the rear end of the film 64 has not yet left the roller pair 52 upon separating the rollers 30a, 30b. Accordingly, in this embodiment, it is so programmed that the roller pair is rotationally driven for a predetermined period of time after the sensor 53 has detected the rear end 75 of the film 64, for instance, until the rear end 75 of the film 64 passes over the nip of the roller pair 52. This can surely convey the film 64 until the rear end passes over the nip of the roller pair 52 while entraining the sheet 14 and the sheet 13 tightly adhered with the cast developer 16.

Figure 15:
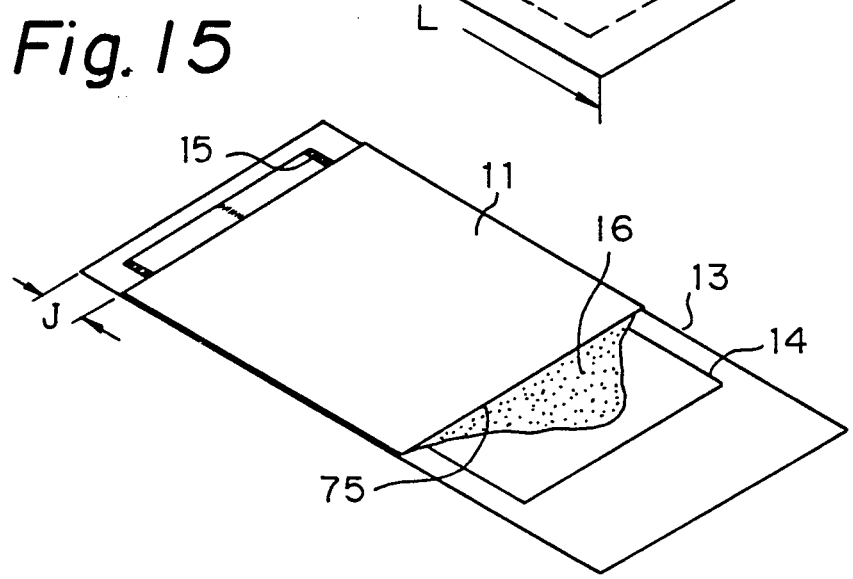
FIG. 15 is a perspective view illustrating one embodiment for the development at the rear end of the photosensitive sheet.

In this embodiment, the length of the sheet 11 necessary for the image preparation is set to about 360 mm, which is longer than the longest inter-roller distance of 150 mm, because the cut sheet 11 can not be conveyed if the longest inter-roller distance is longer than the sheet 11. Therefore, in a case if the marking is detected just after the starting of the copying operation, the length of the sheet 11 is shorter than the length of the sheet 64 required for image preparation, in which image preparation for the required length is not possible and, in addition, the developer 16 exudes from the rear end 75 of the sheet 11 as shown in FIG. 15 when the sheet 11 is discharged in close contact with the sheet 13, with the top end being displaced by "J", to result in contamination to the rollers 30a, 30b. When the rollers 30a, 30b are contaminated, the circularity of the roller is impaired to give undesired effects as described above. In view of the above, if the distance from the rear end 75 of the film 64 to the marking is made greater than about 360 mm of the sheet 64 required for the image preparation, the foregoing disadvantage can be overcome. However, since the detection for the marking is not made at an instance when the sheet 14 is exhausted if there are no jamming, etc. in the usual operation, only the film 64 is left in the vessel 63 and the remaining film 64 causes wasteful loss. With the reason as described above, the distance from the rear end 75 of the film 64 to the marking position is desired to be as short as possible.

In addition to the inhibition for the cutting in the cutting section 20 upon detection of the marking, this embodiment further conducts two procedures, that is, calculating the remaining length of the film 64 based on the time from the start of the conveyance to the detection of the marking and on the length from the marking to the rear end 75 of the film 64, interrupting the copying operation if the calculated length is shorter than the length required for image preparation for one sheet, separating the roller pair 30a, 30b as described above, whereas conducting image preparation if it reaches the image preparation length. This is to be explained specifically in accordance with the flow chart shown in FIG. 16.

When the print key is turned ON, the foregoing copying operation is conducted (step $S_1$). Then, the marking is monitored by the sensor 106 during copying operation (step $S_2$) and, if there is no marking detection, the rotational blade 20a is actuated on every predetermined length for image preparation for one sheet to cut the film 64 into a sheet 11 (step $S_3$), to continue usual copying operation (step $S_4$).

On the other hand, if the marking is detected at the step $S_2$, it is judged whether an image for one sheet can be formed on the remaining film 64 or not, for instance, by detecting the length up to the marking based on the time from the starting of the copying operation for this image preparation to the detection of the marking and adding this to the length from the marking position to the rear end 70 of the film 64 (step $S_5$). If it is judged that on image for one sheet can be formed, the procedure proceeds to step $S_4$ to continue the copying operation as it is (accordingly, cutting of the film 64 in the step $S_3$ is not conducted). On the other hand, if it is judged that the image preparation is impossible, the rollers 30a, 30b are separating and the film 64 is discharged as it is (step $S_6$). All of these controls are conducted by way of the CPU 100 of the control circuit.

When the marking is detected in this control at the step $S_2$, contamination in the machine can be prevented also by separating the roller pair 30a, 30b as it is at the step $S_6$ and discharging the sheets.

Even with the above-mentioned constitution for preventing the jamming of the film 64, jamming may sometime be caused in the image preparing step. In view of the above, if jamming should occur, a jam-countermeasure is conducted by the following procedures.

Namely, if jamming occurs after the cutting of the film 64 and before the developing step, the countermeasure is taken by opening or closing the guide plate 29 as it is with no special procedure or operation. However, if jamming occurs before cutting the film 64 and the sensor 107 has detected the film 64, the rotational blade 20a is actuated to the fixed blade 20b to disconnect the film 64 in the jammed state. Then, the guide plate 29 is opened or closed in this state and, depending on the case, the roller 28 is also rotated further to take out the jammed sheet 11. In this case, since the sensor 107 is within the recess G of the guide plate 103, the film 64 is present at a position at which it is capable of manual removal.

Further, in a case where the sensor 107 has not detected the film 64, a jam-countermeasure is conducted by rotating the roller 27 backwardly for a predetermined period of time to surely escape the film 64 from the nip portion of the roller 27 and pulling out the vessel 63 in the direction of the arrow I in FIG. 11. In this case, if the vessel 63 is pulled out as it is, since the film 64 may possibly be caught between the roller 27, the film 64 is undesirably delivered as the vessel 63 is pulled out. Further, if jamming occurs after the developing step, a countermeasure is conducted by pulling out the sheet from the discharge exits 79 for the sheet 11 and the sheet 14 of the main body as described later.

As has been described above, the following advantageous effects can be obtained according to the first embodiment:

(1) Since the sensor 106 for detecting the marking disposed in the film 64 is provided, the remaining length is calculated based on the detection timing upon detecting the marking by the sensor 106 after starting the conveyance and the copying operation is conducted as it is without cutting the film 64 if it is possible to prepare an image for one sheet, there is no risk of jamming of the film 64 in the machine.

(2) In a case where it is impossible to prepare an image for one sheet, since the cutting is interrupted and the roller pair 30a, 30b are separated to such a distance so as not crush the pod 15, there is no worry that the sheet 14 and the developer in the pod 15 are consumed wastefully by unnecessary development, as well as there is no worry for the leakage of the developer because of the insufficient size of the final sheet of the film 64.

(3) Since the marking is disposed out of the image-preparing region, there is no trouble in the image formation by the application of the marking.

Explanation is now provided for the second embodiment of the present invention.

In the second embodiment, the inner structure, the developing system, the photosensitive film, the positive film and the pod structure are basically identical with those of the first embodiment except that the detection system for the rear end of the photosensitive film is different from the first embodiment. Accordingly, identical or similar elements carry the same reference numerals respectively and duplicate explanations for the respective constituent elements are omitted.

The processing for the final sheet portion of the film 64 contained in the light-screening vessel 63 in the second embodiment will now be explained.

As shown in FIG. 12, a reference mark 70 of a high reflectance, which is different from that of the film 64, is appended as a marking at a predetermined length M from the rear end 75 of the film 64 at the end out of the image forming area 73. The length M is set longer than the longest inter-roller distance in the conveying path, in this embodiment, longer than the distance from the nip of the roller pair 27 to the nip of the rollers 28, 28a (about 150 mm) for avoiding jamming in the same manner as in the first embodiment. The reference mark 70 is detected by the photoreflector type sensor 106 disposed near the cutter section 20 as described above and the detected signal is outputted to the CPU 110 in the control circuit. The CPU 110 recognizes that the film 64 in the vessel 63 is at the final sheet in accordance with the detected input. In this way, in the control circuit, when the reference mark 70 is detected by the sensor 106 during conveyance of the film 64 after starting the copying operation, the CPU 110 receives this input and stops the rotation of the cutter motor 112 to inhibit the cutting of the film 64. Accordingly, the film of at least 150 mm length for the longest inter.roller distance remains in this case and since the cutting is not conducted, for example, even if the marking has been detected just after starting the copying operation, the sheet 11 is conveyed to the roller pair 30a, 30b without being left out side the machine. In this case, the separating timing for the roller pair 30a, 30b is provided by the detection of the rear end of the carrier sheet 13 by the sensor 47. Since the conveying force is removed after separating the roller pair 30a, 30b, the rear end of the film 64 may possibly remain in the roller pair 52 when the roller pair 30a, 30b is separated. Accordingly, it is also programmed in the CPU 110 in this embodiment such that the roller pair is rotationally driven for a predetermined period of time after the detection of the rear end 75 of the film 64 by the sensor 53, for example, until the rear end 75 of the film 64 passes over the nip of the roller pair 52. This can surely convey the film 64 until the rear end passes over the nip of the roller pair 52 after separating the roller pair while carrying together the sheet 14 and the sheet 13 closely adhered to each other by means of the cast developer.

Further, also in this embodiment, the length of the sheet 11 necessary for image preparation is set to about 360 mm, which is longer than the longest inter roller distance 150 mm.

In this embodiment, the net conveying time from the detection of the top end of the film 64 by the sensor 106 to the detection of the marking is counted and the succeeding operation is divided into two courses depending on the counted time. Since the pulling conveying speed is always constant, the distance L from the top end to the marking of the film 64 can be calculated by the counting time.

That is, since the length from the marking position to the rear end 75 of the film 64 is constant and known as described above (M=about 150 mm), if both of them are determined, the remaining length N of the film 64 can be expressed as below:

$$N = L + M = t \times v + M \tag{1}$$

where:
v = conveying speed of the film 64 (constant)
t = conveying time determined from the counter.

Then, depending on whether the remaining length N is sufficient for the required length for the image preparation for the sheet 11 (360 mm) or not, the subsequent operation is divided into two courses.

The equation (1) above is arranged with respect to the time t and divided into the respective cases depending on the length required for the image preparation as below:

a: If insufficient for the required length: (2)
in view of: $t < (360 - M)/v$ and $M = 150$,
$t \geq 210/v$ b: If sufficient for required length: (3)
$t \geq (360 - M)/v$, i.e.,
$t \geq 210/v$ Accordingly, from the equations (2) and (3) above, the situation is divided depending on the value :
$t = 210/v$ At first, if the remaining length N is sufficient for the required length, the film 64 is conveyed and exposed by each of the roller pairs and the optical system unit 1 without cutting. In this case, the film 64 is pulled out to the last from the vessel 63 and the length is longer than the usually cut sheet 64 length. The separating timing for the roller pair 30a, 30b is determined by detecting the rear end of the sheet 13 as described above. Further, since the conveying force is removed after separating the roller pair 30a, 30b, the sheet is conveyed in the same way as in the first embodiment described above.

In the case of the sheet 11 being cut into a normal length in the usual operation, the rear end of the sheet 13 is detected by the sensor 47 after the detection of the rear end of the sheet 11 by the sensor 47. If the developing roller pair 30a, 30b is returned again to the pressurized state for a while after detecting the rear end of the sheet 13, if the length of the sheet 11 is greater than the normal sheet length as described above, the rear end 75 of the sheet 11 is caught by the developing roller pair 30a, 30b, in which it is difficult to take out both of the sheets 11 and 13. Accordingly, it is set in this embodiment such that if the rear end of the sheet 13 has not passed over the nip of the roller pair 52 when the rear end of the sheet 13 is detected by the sensor 47, the roller pair 30a, 30b is returned again to the pressurized state a predetermined time after the detection of the rear end 75 of the sheet 11 by the sensor 42. In this way, by taking the reference not on the side of the sheet 13 but on the side of the film 11, the foregoing disadvantage can be overcome and the sheet 11 and the sheet 13 appended with the sheet 14 can be taken out easily by an operator.

Figure 17:
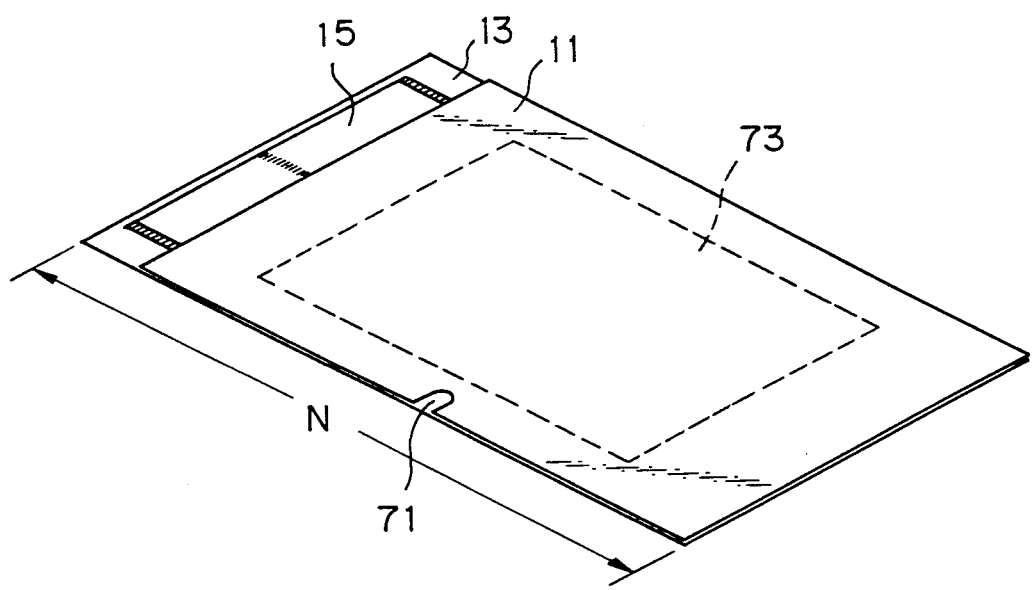
FIG. 17 is a perspective view illustrating the state of the sheet using a recess as the marking during development.

The sheet 11 and the sheet 13 are taken out from the inside of the machine in a state where the photosensitive surface of the sheet 64 and the image receiving surface of the positive sheet are opposed by way of the cast developer 16 with the sheet being on the upper side. In this case, if L+M is longer than 360 mm, the reference mark 70 or the recess 71 as the marking is present in the entire length N of both of the taken out sheets 11 and 13 as shown in FIG. 17. Accordingly, if the detected portion is present in the image forming area 73 of the sheet 11, the image can not be formed in this portion. Accordingly, in this embodiment, the reference mark 70 is disposed on the rear side of the photosensitive surface of the sheet 64 or, in the case of the photosensitive surface, it is disposed at a portion of the marginal length E' in the lateral direction shown in FIG. 2. Further, the recess 71 is disposed to a position outside from the collar portions $L_1$, $L_2$ shown in FIG. 4. This can perform satisfactory image preparation with no defect such as intrusion of the marking, for example, the reference mark 70 or the recess 71 to the image forming area or the leakage of the developer 16 from the recess 71.

On the other hand, if the remaining length N is shorter than the length required for image formation, that is, shorter than 360 mm, an image of required length can not be formed and, in addition, developer exudes from the rear end 75 of film 64 to contaminate the rollers 30a, 30b and give undesired effects on the image formation. Accordingly, usual image formation is not conducted. The operation in this case will now be explained below.

In this case, the film 64 is conveyed by means of the pulling rollers 18a, 18b, the roller pair 27, etc. to the roller pair 30a, 30b without cutting. the optical system unit 1 inhibits the scanning and may not conduct exposure in this case. In this instance, when the top end of the sheet 11 is detected by the sensor 42, the cam 45 is actuated to separate the roller pair 30a, 30b. The separating timing can be set by the elapse of a predetermined period of time after the detection of the top end by the sensor 106, not utilizing the sensor 42. The separating amount is determined to such a distance H as not to crush pod 15 as has been described above. The roller pair 38 is driven rotationally for a predetermined period of time after the detection of the rear end of the sheet 13 by the sensor 37 until the rear end passes over the nip of the roller pair 38 and then stops. The roller pair 52 is also driven rotationally for a predetermined period of time after the detection of the rear end 75 of the sheet 11 by the sensor 51 until the rear end 75 thereof passes over the nip of the roller 53 and thereafter stops. Further, the roller pair 52 is disposed such that the distance P from the nip thereof to the discharging exit 79 is shorter than the distance M from the marking to the rear end 74 of the film 64 (about 150 mm). In this constitution, since the top end of the sheet 11, even of the minimum sheet length M, is exposed from the discharging exit 79, it can be taken out easily.

In the same manner, the roller pair 38 is disposed such that the distance Q from the nip thereof to the discharging exit 79 is shorter than the length of the sheet 13. In this constitution, since the top end of the sheet 13 is exposed from the discharging exit whenever the rear end of the sheet has passed over the nip of the roller pair 38, the sheet can be taken out easily.

By the operation with the foregoing constitution, all of the sheets 11, 14 and 13 can easily be taken out of the machine without being caught in the roller pairs 52, 38, 30a, 30b under pressure and with no load and the sheet 64 is not left in the machine. Further, since the roller pair 30a, 30b is separated at least by the distance H, the sheet 13 can be taken out without crushing the pod 15 appended at the top end of the sheet 13. In this case, since the sheet 14 has no photosensitivity, it can be taken out in a re-usable state to prevent wasteful consumption of the sheet 14.

It is programmed such that if the sheet 11 clogs by jamming in the conveying path or, if an erroneous cutting operation, etc. is caused, the sheet 14 is automatically discharged by the instruction from CPU 110 and, also in this case, the roller pair 30a, 30b is separated by greater than the distance H. Therefore, if jamming of the sheet 11 should occur, the sheet 14 containing the pod 15 can always be taken out in a re-usable state. This can prevent the sheet 14 from being left without taking out and from double insertion upon occurrence of jamming of the sheet 11.

Figure 18:
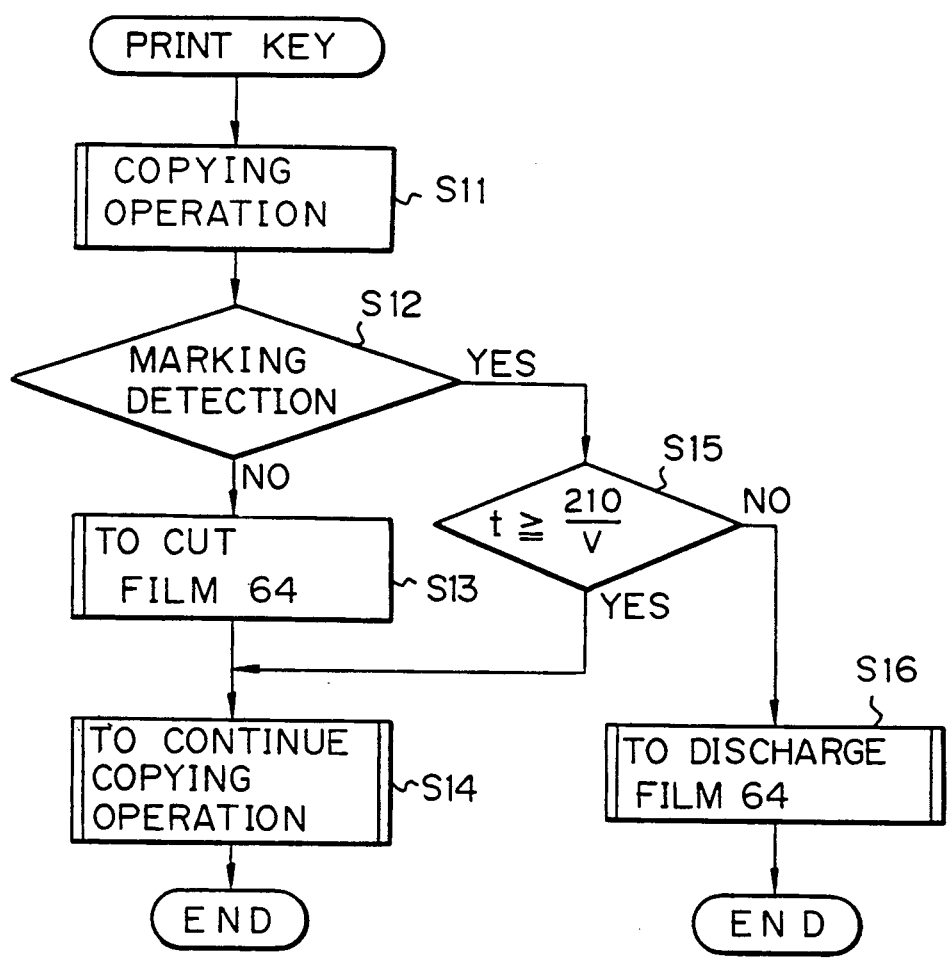
FIG. 18 is a flow chart illustrating another embodiment of the processing procedures.

The operations as described above are explained in accordance with the flow chart shown in FIG. 18.

When the print key is turned ON, the foregoing copying operation is conducted (step $S_{11}$). Then, the marking is monitored by the sensor 106 in the course of the copying operation (step $S_{12}$) and, if there is no detection for the marking, the photosensitive strip-like material is cut by the cutter 20a, 20b on every predetermined image preparation length for one sheet to prepare each of the sheets 11 (step $S_{13}$) and predetermine copying operation is continued (step $S_{14}$).

On the other hand, if the marking is detected at the step $S_{12}$, the value : $t = 210/v$ is calculated by the CPU 110 to judge whether the image for one sheet can be formed or not with the remaining film 64 based on the equation (3) (step $S_{15}$). Then, when it is judged that image preparation for one sheet is possible based on the calculated length, the operation proceeds to the step $S_{14}$ to continue the copying operation as it is. On the other hand, if it is judged that the image preparation is impossible, the roller pair 30a, 30b is separated and the film 64 is discharged as it is (step $S_{16}$). All of these control operations are conducted by way of the CPU 110 in the control circuit.

As has been described above, the following effects can be obtained by the second embodiment.

(1) The marking disposed on the film 64 is detected and, when it is detected, the remaining length N is calculated based on the time from the top end of the film 64 detected by the sensor 106 and the known length from the marking to the rear end of the film 64. In a case where image preparation for one sheet is possible, the copying operation is continued as it is without cutting the film 64. Accordingly, there is no risk of the jamming of the film 64 at the inside of the machine caused by the cutting of the rearmost end.

(2) In a case where the image preparation for one sheet is impossible, since the cutting is inhibited and the developing roller pair 30a, 30b is separated to such a distance so as not to crush the pod 15, there is no worry for the wasteful consumption of the positive sheet 14 and the developer pod 15 by unnecessary development, as well as there is no worry for the leakage of the developer caused by the insufficient length of the final sheet of the film 64.

(3) Since the marking is disposed out of the image preparation range, there is no trouble in the image formation by the application of the marking.

The third embodiment will now be explained hereinafter.

In this third embodiment, a flexible strip-like member other than the photosensitive film is appended to the rear end of the photosensitive film and the flexible strip-like material or the boundary between the flexible strip-like material and the photosensitive film is used as the marking. Since the inner structure, the developing system, the photosensitive film, the positive film and the pod structure are basically identical with those in the second embodiment described above, identical or similar constituent elements with those in the second embodiment carry the identical reference numerals and duplicate explanations for the respective constituent elements are omitted.

Figure 19:
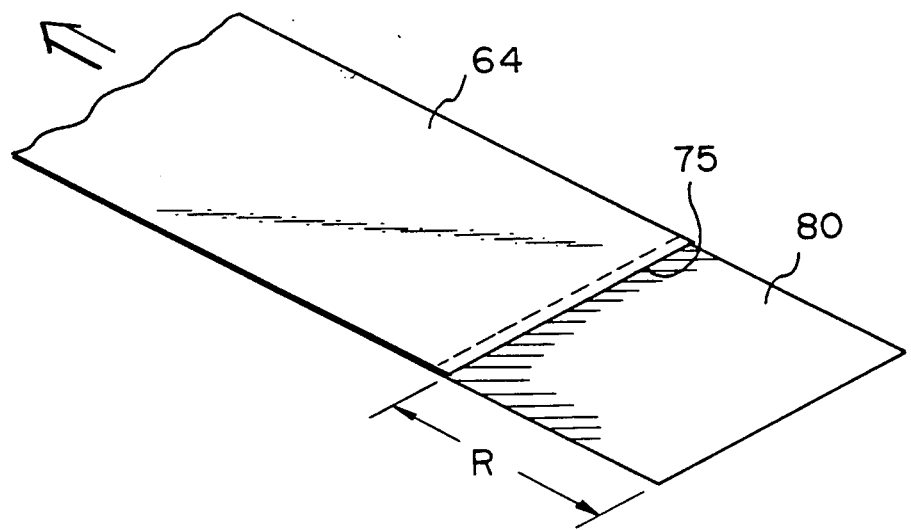
FIG. 19 is a perspective view illustrating the rear end of the photosensitive material appended with a flexible strip-like material.

FIG. 19 is a perspective view for the rear end of the rolled photosensitive material, that is, the photosensitive film according to the third embodiment.

As shown in the drawing, a flexible strip-like material 80 comprising a flexible paper sheet having a width substantially identical with and a reflectance different from the film 64 is appended to the rear end 75 of the rolled film 64 shown in FIG. 2. Since the photo-sensitive surface of the film 64 is black, white strip-like material 80 is selected, for example, and the length R from the rear end 75 of the film 84 to the rear end 81 of the strip-like material 80 is made at least greater than the longest inter-roller distance as described above, that is, greater than about 150 mm. Further, the carrier sheet 13, the positive film 14 and the pod 15 are identical with those shown in FIG. 3.

When the film 64 is constituted in this way, since the output from the reflection type sensor (photoreflector) changes when the area sensed by the sensor transfers from the film 64 to the strip-like material 80, the position for the rear end 75 of the film 64 can be detected. The operation in the case of using the film 64 of this type will now be explained.

The rolled film 64 is contained in the vessel 63 and set to a predetermined position in the copying machine. Then, it is pulled out each by one sheet by the pulling roller pair 18a, 18b, and the top end of the film 64 is detected by the sensor 106. In a case where the length of the film 64 is greater than the minimum image preparation length M, it is conveyed for a predetermined length longer than the minimum image preparation length M and, subsequently, cut by the cutter section 20 as described above. Then, the film is conveyed to the roller pair 30a, 30b, joined with the sheet 14 as described above and passed through the roller pair 30a, 30b to burst the pod 15, thereby conducting development. In a case where the remaining length of the film 64 in the portion for the final sheet is greater than the distance S from the displacement J to the rear end of the sheet 14 and shorter than the distance T to the rear end of the sheet 13, conveyance and development are conducted in the same way. In this case, excess developer 16 is stored in the portion D of the sheet 13 between the sheet 11 and the strip-like material 80 shown in FIG. 3, in which there is no worry that the developer 16 exudes to contaminate the roller pair 30a, 30b, etc.

In a case where the length of the film 64 is shorter than the distance S, the position at which the strip-like material 80 is at first recognized as the marking position described above and the treatment is conducted by the procedures along with the flow chart shown in FIG. 18 in the same manner as the treatment for the rear end of the film 64 in the second embodiment and the cutting by the cutter section is inhibited. At the same time, the roller pair 30a, 30b is separated to avoid the crushing of the pod 15 and the film 64 appended with the strip-like material 80, the sheet 14 and the sheet 13 appended with the pod 15 are discharged as they are. In this case, since the strip-like material 80 is formed with the white paper sheet, it is possible to detect the staying of the strip-like material 80 in the machine by the sensor 106. Accordingly, it is also possible, in addition to the treatment as described above, to actuate the rotational blade 20a to cut the strip-like material 80 in the cutter section 20 and discharge the film 64, the sheet 14 and the sheet 13 appended with the pod 15 as they are as described above. Also as it is possible to inhibit the copying operation of the machine from the CPU 110 and indicate the exhaustion of the film 64 to instruct the replacement of the film 64. In a case where the strip-like material 80 is cut at an intermediate portion, although the remaining cut portion is left in the machine, the remaining portion may be left as it is at the upstream in the conveying direction of the cutter section 20 or, alternatively, it may be conveyed, for example, downstream and stopped at the portion of the roller 28 where it can be taken out easily.

In this way, when the strip-like material 80 is appended to the rear end 75 of the film 64, since the rear end part of the film 64 that has to be finally discarded is replaced with the flexible strip-like material 80, the necessary length of the film 64 can be shortened to economize the amount of the film 64.

However, when the film 64 is appended with the strip-like material 80, a step is formed at the joined portion to result in a partial pressure difference when the film is rolled. Such a pressure difference causes a difference in the sensitivity thereby resulting in the difference of the density and the change of tone referred to as pressure marks on the formed image. This can be prevented by winding the film with no core and setting the inner circumference of the winding diameter greater than the sheet length of the strip-like material to be appended.

Further, when the strip-like material 80 is appended to the rear end of the film 64, since the strip-like like material is detected when the final sheet is detected by the sensor 106, the sensor can always detect a portion different from the film 64 and recording means for the residual amount in the cartridge comprising the vessel 63 can be saved. While the paper sheet is selected as the strip-like material 80 in the embodiment described above, films of other different color may also be selected.

The following advantageous effects can be obtained by the third embodiment as described above.

(1) Since the strip-like material 80 is appended to the film 64, the boundary between the strip-like material 80 and the film 64 is detected as the marking, the remaining length N is calculated, when the marking is detected, based on the time from the top end of the film 64 detected by the sensor 106 and the known length to the boundary, and the film is cut by the cutter section 20 to continue the copying operation as it is, if image preparation for one sheet is possible, the so that whole length of the film 64 can be used with no wasteful loss.

(2) Since the strip-like material 80 remains at least by the length for the longest inter roller distance, the film 64 can be discharged as it is by separating the roller pair 30a, 30b, if image preparation for one sheet is impossible with the remaining length of the film 64, there is no jamming worry of the film 64 in the machine caused by the cutting for the rearmost end.

(3) If it is impossible for image preparation for one sheet, since the cutting is inhibited and the roller pair 30a, 30b is separated to such a distance so as not to crush the pod 15, there is no worry that the sheet 14 and the developer pod 15 are used wastefully by unnecessary development, as well as there is no worry at the leakage of the developer caused by the insufficient size of the final sheet of the film 64.

(4) Since the material of reflectance or different color from that of the film 64 is selected for the strip-like material, the portion after the rear end of the film 64 can surely be detected and corresponding control is possible.

The fourth embodiment will now be explained hereinafter.

In this fourth embodiment, the inner structure, the developing system, the photosensitive film, the positive film and the pod structure are basically identical with those in the first embodiment except that the way of detecting the final end of the photosensitive film is somewhat different from that in the first and the second embodiments. Accordingly, identical or similar constituent elements carry the same reference numerals and duplicate explanations for such constituent elements are omitted.

Figure 20:
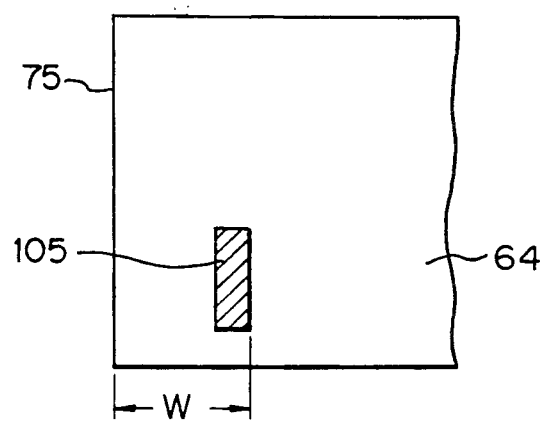
FIG. 20 is a plan view for a portion illustrating one embodiment of the end mark.

In this embodiment, an end mark 105 is disposed on the rear face of the film 64, that is, on the side opposed to the photosensitive surface at a distance W from the final end as shown in FIG. 20. Further, the distance W is set such that:

$$W > W_1$$

in which $W_1$ represents the distance between the roller pair 18a, 18b disposed on both sides of the cutter section 20 and the roller pair 27. It is further assumed that the distance between the sensor 25 and the sensor 106 is $W_2$ and the predetermined length of the sheet 11 required for the image preparation for one sheet is $W_0$. As has been described above, the cutting length for the sheet 11 is determined based on the timing after the detection of the top end of the film 64 by the sensor 25. In the same way, when the sensor 106 detects the mark 105, the photosensitive sheet length $W_F$ conveyed so far to the downstream in the conveying direction from the sensor 25 can also be determined.

Figure 16:
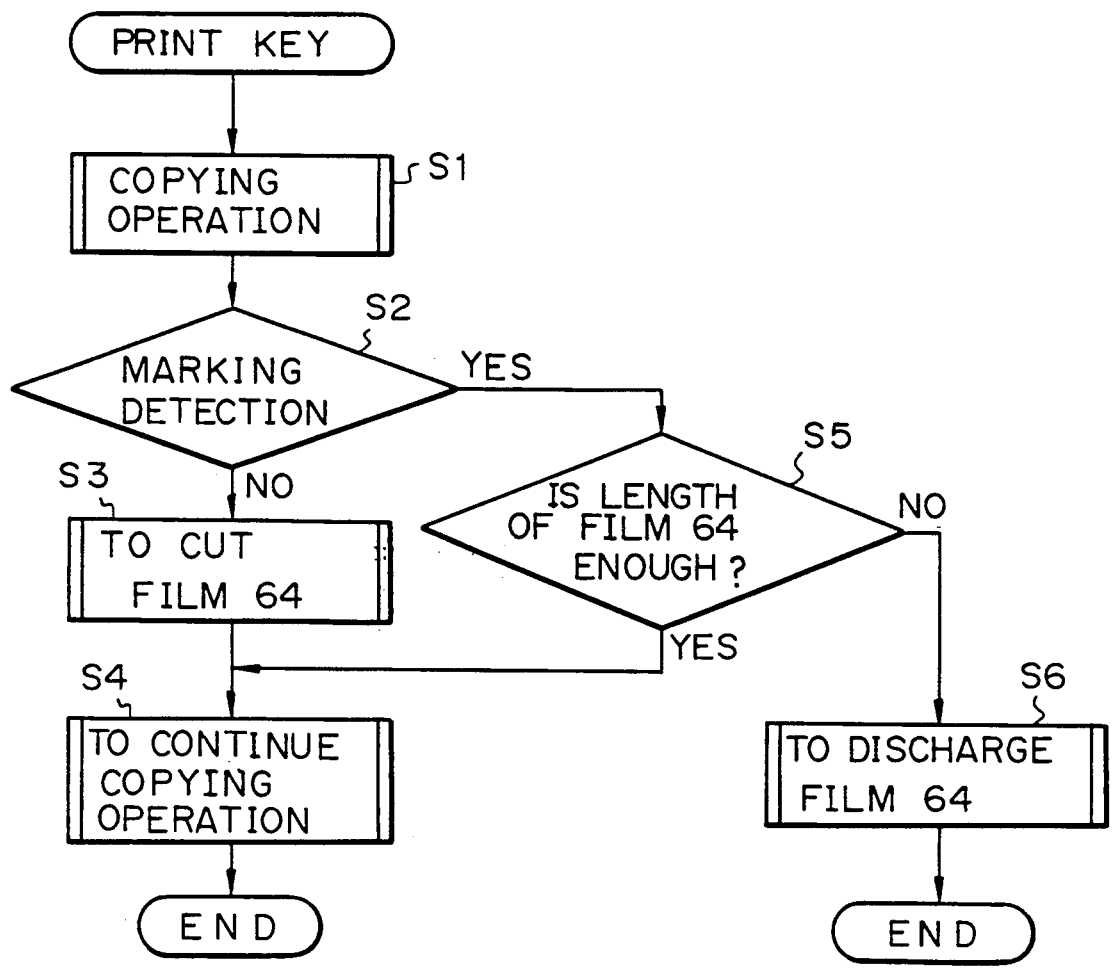
FIG. 16 is a flow chart illustrating one embodiment of the processing procedures.

Then, when the sensor 106 detects the mark 105 during conveyance of the film 64, if the length of the photosensitive sheet length $W_F$ is:

$$W_F \geq W_0 - W - W_2$$

the same procedures as those from the step $S_5$ to the step $S_4$ are taken in the flow chart shown in FIG. 16, by which the actuation of the rotational blade 20a is inhibited, the copying operation is continued as it is, image preparation is conducted and the sheet 11 and the sheet 14 are discharged.

On the other hand, if the photosensitive sheet length $W_F$ is:

$$W_F < W_0\text{-}W\text{-}W_2,$$

the film 64 is conveyed until the rear end 75 of the film 64 has passed over the roller pair 27 and the conveyance is stopped at the instant it passes over the roller pair 27. The conveyance is stopped with an elapse of a predetermined period of time after the sensor 106 has detected the rear end 75 of the film 64. In this case, the sheet 14 appended to the sheet 13 is discharged out of the machine in the state where the roller pair 30a, 30b is separated by the distance H as described above.

In this case, since the distance W from the mark 105 to the rear end 75 is set greater than the distance $W_1$ between the roller pair 18a, 18b and the roller pair 27, the film 64 does not stay between both of the roller pairs even if the foregoing treatment has been conducted and it is surely conveyed from the roller pair 27 downstream. Further, by the treatment as described above, if the film 64 is cut at random due to jamming, etc. the length of the sheet 1 remaining in the final stage is larger than the distance W and the film 64 does not stop at a position causing operation difficulty. Thus, it is also possible to take easy jam-countermeasure. Further, since a length greater than the length $W_0$ can be secured for the sheet 11 delivered to the roller pair 30a, 30b, there is no trouble due to exudation, of the developer 16, etc. In addition, since the possibility of jam occurrence is not so high, the film is often discharged while inhibiting the actuation of the rotational blade 20a and the longest sheet length is $W_0+W$ in this case, it is only necessary to add the length W to the length required for image preparation, by which unnecessary use of the film 64 is not increased.

As has been described above, the following advantageous effects can be obtained by the fourth embodiment.

(1) The mark 105 disposed on the film 64 is detected and, if it is detected, the remaining length is calculated based on the distance from the top end of the film 64 detected by the sensor 25 and the known length from the mark 105 detected by the sensor 106 to the rear end of the film 64. Then, if image preparation for one sheet is possible, the copying operation is conducted as it is without cutting the film 64. Accordingly, there is no worry of jamming of the film 64 in the machine caused by the cutting of the rearmost end.

(2) In a case where the image preparation for one sheet is impossible, since the cutting is inhibited and the film 64 is conveyed until the rear end 75 of the film 64 passes over the intermediate roller pair 27 and then stops, there is no risk of jamming of the film 64 near the cutter section 20, thereby enabling easy jam countermeasures.

(3) Since the roller pair 30a, 30 is separated in this case to such a distance so as not to crush the pod 15, there is no worry that the sheet 14 and the developer in the pod 15 are used wastefully, as well as there is no worry for the leakage of the developer caused by the insufficient length of the final sheet of the film 64.

(4) Since the mark 105 is disposed at the rear face of the film 64 out of the image preparation region, there is no trouble in the image formation caused by the application of the mark 105.

Many widely different embodiments of the present invention may be constructed without departing from the spirit and scope of the present invention. It should be understood that the present invention is not limited to the specific embodiments described in this specification, except as defined in the appended claims.

What is claimed is:

1. An image reproducing device comprising:
    a storing means for storing a strip-like photosensitive material so that said photosensitive material is rolled up, said photosensitive material having a mark at a first predetermined length from a final end of said rolled photosensitive material;
    a conveying means for pulling out said rolled photosensitive material from said storing means and conveying said photosensitive material;
    a cutting means for cutting successively said conveyed photosensitive material into respective photosensitive sheets each with a second predetermined length;
    a pair of developing rollers for rolling each of said cut photosensitive sheets put together with a transfer sheet between which a developer-containing pod is interposed;
    a detecting means for detecting said mark of said conveyed photosensitive material;
    a measuring means for measuring a remaining length of said stored photosensitive material when said detecting means detects said mark of said conveyed photosensitive material; and
    a separating means for separating a pair of said developing rollers from each other when said measured remaining length is less than a length required for image formation.

2. An image reproducing device according to claim 1, wherein said device further comprises an inhibiting means for inhibiting said cutting means from cutting said conveyed photosensitive material when said detecting means detects said mark of said conveyed photosensitive material.

3. An image reproducing device according to claim 2, wherein said measuring means further comprises a counting means for counting a period of time from the cutting of said photosensitive material by said cutting means to detection of said mark by said detecting means, and a calculation means for calculating said remaining length of said stored photosensitive material based on said period of time counted by said counting means.

4. An image reproducing device according to claim 2, wherein a separating amount of a pair of said developing rollers separated by said separating means is set to such a distance that said pod interposed between each of said photosensitive sheets and said transfer sheet is not crushed when both of each of said photosensitive sheets and said transfer sheet are passed between said pair of said developing rollers.

5. An image reproducing device according to claim 1, wherein said mark is positioned out of a latent image forming area of said photosensitive material.

6. An image reproducing device according to claim 1, wherein said just predetermined length relating to said mark on said photosensitive material is set longer than the longest inter-roller distance between conveying rollers disposed in a conveying path of said photosensitive sheets.

7. An image reproducing device comprising:

a storing means for storing a strip-like photosensitive material so that said photosensitive material is rolled up, said photosensitive material having a mark formed as a boundary between a rear end of said rolled photosensitive material and a flexible strip-like material which is appended to said rear end, said strip-like material having a first predetermined length;

a conveying means for pulling out said rolled photosensitive material from said storing means and conveying said photosensitive material;

a cutting means for cutting successively said conveyed photosensitive material into respective photosensitive sheets each with a second predetermined length, a pair of developing-rollers for rolling each of said cut photosensitive sheets put together with a transfer sheet between which a developer-containing pod is interposed;

a detecting means for detecting said mark of said conveyed photosensitive material;

a calculation means for calculating a final image forming area for said photosensitive material based on the detection of said mark by said detecting means; and a separating means for separating a pair of said developing rollers from each other when said calculated final image forming area is less than an image forming area required for image formation.

* * * * *

UNITED STATES PATENT AND TRADEMARK OFFICE
CERTIFICATE OF CORRECTION

PATENT NO. : 5,060,012
DATED : October 22, 1991
INVENTOR(S) : Seto et al.

It is certified that error appears in the above-identified patent and that said Letters Patent is hereby corrected as shown below:

At column 22, line 66, change "just" to --first--.

Signed and Sealed this

Sixteenth Day of March, 1993

*Attest:*

STEPHEN G. KUNIN

*Attesting Officer*        *Acting Commissioner of Patents and Trademarks*